2,803,641
PREPARATION OF ACRYLONITRILE

Walter J. Sandner, Carpentersville, and William L. Fierce, Crystal Lake, Ill., assignors to The Pure Oil Company, Chicago, Ill., a corporation of Ohio No Drawing. Application December 6, 1955, Serial No. 551,215

9 Claims. (Cl. 260—465.3)

This invention relates to the preparation of unsaturated nitriles, through the reaction of nitric oxide and a saturated hydrocarbon. More particularly, this invention is related to the high temperature preparation of acrylonitrile and similar unsaturated nitriles through the reaction of an acyclic saturated hydrocarbon with nitric oxide.

Unsaturated nitriles, particularly acrylonitrile, have found extensive use in various industries, notably as intermediates in the preparation of various organic chemicals. Acrylonitrile is frequently employed as a reactant in the preparation of acrylopolymers and resins for the paint industry, acrylic plastics and nitrile rubber. Acrylonitrile is at present being commercially produced in tonnage amounts by two processes. One process is based upon the reaction of hydrogen cyanide and acetylene at 80° C. in an aqueous solution of cuprous chloride. In the other process, hydrogen cyanide and ethylene oxide are contacted at superatmospheric pressure and a temperature above 90° C. to yield ethylene cyanohydrin,

(HO—CH$_2$—CH$_2$—CN)

which is then dehydrated to yield acrylonitrile

(CH$_2$=CH—CN)

Another process involves the pyrolysis of a gas mixture of non-aromatic hydrocarbons (containing at least 2 carbon atoms) and hydrogen cyanide at 750–1000° C. at atmospheric pressure. This process forms contaminating by-products, such as benzene and acetonitrile, which may require special means for separating them.

Other processes involve the reaction between olefins and ammonia in the presence of oxygen and an oxidation catalyst to yield acrylonitrile.

One process employs natural gas and ammonia, with the conversion of the natural gas to acetylene and, by reaction with ammonia, to hydrogen cyanide. The subsequent reaction between hydrogen cyanide and acetylene yields the desired acrylonitrile. This is a complicated procedure with the production of interfering by-products.

We have discovered an efficient, simple and economical method of preparation of acrylonitrile and other unsaturated nitriles. In our process a saturated acyclic hydrocarbon is contacted at a temperature above about 600° C. with nitric oxide at atmospheric pressure in the presence of a hydrocarbon cracking catalyst containing substantial amounts of silica and alumina to yield the desired nitrile.

It is an object of our invention to prepare unsaturated nitriles by reaction between nitric oxide and acyclic saturated hydrocarbons.

It is another object of this invention to prepare acrylonitrile from nitric oxide and ethane and/or propane in the presence of a hydrocarbon cracking catalyst.

It is yet another object of this invention to provide a process for preparing acrylonitrile and similar unsaturated nitriles in high yield without concomitantly forming substantial amounts of hydrogen cyanide.

It is a further object of this invention to react nitric oxide and at least one saturated hydrocarbon in gaseous phase to yield at least one type of unsaturated nitrile in relatively great amounts without concomitantly producing large amounts of hydrogen cyanide.

In general, our invention resides in reacting nitric oxide and a saturated hydrocarbon in gaseous phase in a novel manner to produce one or more unsaturated nitriles, particularly acrylonitrile.

More particularly, our invention comprises reacting nitric oxide and at least one saturated acyclic hydrocarbon in gaseous phase at about 600–900° C. and at atmospheric, sub-atmospheric or super-atmospheric pressure, in the substantial absence of oxygen and in the presence of a silica- and alumina-containing catalyst.

When nitric oxide (NO) is brought into contact with air or other source of oxygen, it immediately combines with the oxygen present, forming brownish-red fumes of nitrogen peroxide. Since nitrogen peroxide is inimical to the formation of desired nitriles, its presence in the reaction mixture should be avoided. Nitric oxide prepared by any method, conventional or otherwise, and which is pure or substantially pure, or which contains only impurities which will not seriously interfere with the process of our invention or seriously contaminate the acrylonitrile or other unsaturated nitriles obtained by the process, may be used. Pure or substantially pure nitric oxide is preferred.

The other reactant for our process may be any type of saturated hydrocarbon having at least two carbon atoms or a mixture of two or more types of such saturated hydrocarbon in any proportion. The saturated hydrocarbon or hydrocarbons must be in gaseous form at the temperatures at which our process reaction occurs. In order to facilitate recovery of the product, however, it is preferred, though not essential, to employ a pure, or substantially pure, single type of saturated hydrocarbon. The saturated hydrocarbons may be straight or branched chain such as ethane, propane, butane, isobutane and pentane and isopentane. The hydrocarbon reactant may be obtained from any conventional source such as from natural gas, or from mineral oil by fractionation or suitable cracking of selected fractions. Although impurities such as small amounts of hydrogen or nitrogen which will not seriously interfere with the process of our invention, or seriously contaminate the unsaturated nitriles produced and render their recovery difficult, may be tolerated in the hydrocarbon, pure or substantially pure hydrocarbons are preferred, singly or in mixtures of any desired proportions. The mole ratio of hydrocarbon reactant to nitric oxide may vary within wide limits, such as, for example, 1–50 of the former to 50–1 of the latter. A suitable non-limiting example is a mole ratio of hydrocarbon reactant to nitric oxide of 22:1. Other suitable ratios are 1:5 and 10:1.

The catalyst of our process is any suitable hydrocarbon cracking catalyst which catalyzes the reaction between nitric oxide and one or more saturated hydrocarbons to produce substantial amounts of unsaturated nitriles and not more than minor amounts of hydrogen cyanide. We have found that hydrocarbon cracking catalysts containing silica and alumina in more than trace amounts, such as, those containing 80–90% silica and 10–20% alumina, are suitable for use as the catalyst of our process singly or in mixtures. Thus, Synthetic Thermofor Catalytic Cracking (TCC) type catalyst S–46, which is a co-precipitated catalyst containing approximately 87% silica and approximately 13% alumina has been found to perform satisfactorily as the catalyst in our process. The catalyst may be natural aluminum silicate catalyst or synthetic types containing silica and alumina, with or without other oxides such as zirconia and magnesia. It may be made by co-precipitation or by impregnation of one material by another. Such catalysts are well known in the art as exemplified by Patents Nos. 2,562,888, 2,561,422, 2,551,014 and 2,529,283.

The conversion may be carried out in a static, moving or fluid bed operation. We prefer to operate continuously with a space velocity (volume of reactants at standard temperature and pressure per unit volume of catalyst) of 50 to 2500.

Our process is carried out at atmospheric pressure, although superatmospheric or subatmospheric pressures may be employed if desired.

Our process is carried out at any temperature above about 600° C. and less than the temperature at which the catalyst will cease to function satisfactorily, that is, temperatures up to about 900° C. The preferred temperature range will vary, depending on, among other factors, the particular catalyst used, the types and concentrations of the saturated hydrocarbon reactants, and the pressure utilized.

Our process comprises, therefore, introducing nitric oxide and one or more saturated hydrocarbons, which contain at least two carbon atoms separately or in admixture and in any suitable mole ratio of hydrocarbon to nitric oxide, into a reaction zone containing catalyst maintained at the desired temperature. Heat may be supplied to the system by any suitable means, such as electric heating coils, preheated pebbles, as in a pebble heater apparatus, or direct heating by hot furnace gases. During the period of contact of the reactants and catalyst under the above reaction conditions, the reactants react to form one or more unsaturated nitriles is substantial yield, with very little production of hydrogen cyanide. The gaseous products and any unreacted reactants, after withdrawal from the reaction zone, are subjected to any suitable conventional method for separating the unsaturated nitriles produced from the other gaseous constituents in the exited gas mixture. Thus, for example, the gas mixture may be condensed and subjected to fractional distillation, or may be exposed to a suitable solid adsorbent selective for the unsaturated nitriles to be recovered. Solvent extraction and other methods may be employed instead.

It should be noted that the unsaturated nitrile produced by our process does not necessarily depend on the type of saturated hydrocarbon reactant utilized. Thus, high yields of acrylonitrile of the formula $CH_2=CH-CN$ may be obtained when either ethane, propane or higher molecular weight paraffins are reacted with the nitric oxide as above-described.

The following Table I sets forth examples of actual tests performed, which more clearly illustrate the process of our invention. In each case, the run was performed by passing the hydrocrabon and nitric oxide through a Pyrex glass tube of ¾ inch inside diameter packed with about 50 grams of the designated catalyst. The runs were made on the basis of a once through operation and samples of the effluent gas mixture were taken and analyzed by means of a mass spectrometer for the concentration of the various constituents.

Table I

| Run Number | (1) | (2) | (3) | (4) | (5) | (6) |
|---|---|---|---|---|---|---|
| Hydrocarbon | Ethane | Ethane | Ethane | Ethane | Ethane | Ethane. |
| Catalyst | None | Synthetic[1] TCC type S-46. | None | None | Synthetic TCC type S-46. | Synthetic TCC type S-46. |
| Temperature, ° C | 865 | 750-770 | 915 | 750 | 759 | 711. |
| Pressure | Atmospheric. | Atmospheric. | Atmospheric. | Atmospheric. | Atmospheric. | Atmospheric. |
| Mole Ratio, Hydrocarbon:NO | 22.2 | 22.2 | 38.6 | 23.7 | 21.5 | 21.0. |
| Gaseous Hourly Space Velocity of charge | 272 | 272 | 281 | 286 | 288 | 287. |
| Conversion per pass: | | | | | | |
| Ethane | | | 93.4 | 11.2 | 12.3 | 4.1. |
| NO | | | 100 | 1.7 | 62.5 | 22.0. |
| HCN Yield per pass, Mol Percent[2] | 25.1 | 0.0 | 94 | 0.0 | 0.0 | 0.0. |
| Acrylonitrile yield/pass, Mol Percent[2] | 3.1 | 11.0 | 6 | 0.4 | 4.6 | 4.3. |
| Selectivity[3]: | | | | | | |
| Acrylonitrile | | | 6 | 25 | 7.4 | 19.3. |
| Hydrogen Cyanide | | | 94 | 0.0 | 0.0 | 0.0. |

[1] This catalyst is a bead type catalyst prepared by co-precipitation of silica and alumina and contains 87% silica and 13% alumina.
[2] Yields per pass are calculated as the molar yield of the indicated product expressed as a percentage of the moles of nitric oxide (limiting reactant) in the feed gas.
[3] Selectivity means the mole per cent of NO reacting that is converted to the particular compound.

From the above runs it is seen that substantial yields of acrylonitrile are produced without production of hydrogen cyanide when using a silica-alumina catalyst. Whereas a yield of 11 mole percent of acrylonitrile was obtained in run 2, with no hydrogen cyanide being produced, in run 1 a 25.1 mole percent yield of hydrogen cyanide was obtained with only a 3.1 mole percent yield of acrylonitrile without catalyst; and in run 3, 94 mole percent of HCN to 6 mole percent of acrylonitrile was produced. Although the selectivity for acrylonitrile in run 4 was high, substantially no acrylonitrile was produced.

Thus, runs 1, 3 and 4 show that when the reaction is carried out in the absence of a silica-alumina catalyst low yields of unsaturated nitriles are obtained with hydrogen cyanide as the principal product; or the selectivity for HCN is high.

Our process may be run on a once-through basis, as in the above runs, or on a recycling basis, where the treated gaseous mixture may optionally have desired unsaturated nitriles and any HCN separated therefrom and then recycled for recontacting to react any unreacted components therein with or without the addition of further amounts of saturated hydrocarbon and the nitric oxide, depending upon whether the process is to be on a batch, semi-continuous, or on a continuous basis. Hydrogen is also preferably separated at least to some extent in order to prevent build-up in the system.

The reaction conditions may be adjusted within the ranges above-defined in order to obtain optimum yields and selectivity for the unsaturated nitrile products when saturated hydrocarbons other than those listed in the above table are utilized.

We claim and particularly point out as our invention:

1. The process for the preparation of acrylonitrile which comprises the step of contacting a gas containing at least one acyclic saturated hydrocarbon having at least 2 carbon atoms with nitric oxide in the substantial absence of other oxidizing agents in a reaction zone at temperatures above about 600° C. in the presence of silica-alumina catalyst.

2. The process of claim 1 in which said temperature is about 600–900° C., said nitric oxide is substantially pure and said gas containing said hydrocarbon is substantially pure hydrocarbon.

3. The process of claim 2 in which said hydrocarbon is present in a molar ratio to said nitric oxide of about 50:1 of the former to 1:50 of the latter.

4. The process of claim 3 in which said hydrocarbon is ethane and in which substantially no hydrogen cyanide is concomitantly formed during said reaction.

5. The process of preparation of acrylonitrile with substantially no concomitant preparation of hydrogen cyanide which comprises contacting substantially pure nitric oxide in the substantial absence of other oxidizing agents with substantially pure ethane in a molar ratio of ethane to nitric oxide of about 22:1 in a reaction zone heated to about 650–900° C. at a gaseous hourly space velocity of about 50–2500 in the presence of a catalyzing amount of a silica-alumina catalyst and recovering acrylonitrile from the reacted gases.

6. The process of claim 5 in which said gaseous hourly space velocity is about 270, said catalyst is a synthetic thermal catalytic cracking catalyst comprising about 80–90% silica and 10–20% alumina, said temperature is about 750–770° C. and the pressure is substantially atmospheric.

7. The process of preparing acrylonitrile comprising reacting a paraffinic hydrocarbon with nitric oxide in the substantial absence of oxygen at temperatures of about 711–770° C. in the presence of a silica-alumina catalyst.

8. Process in accordance with claim 7 in which the catalyst is a coprecipitated catalyst containing 87% silica and 13% alumina.

9. Process in accordance with claim 7 in which the hydrocarbon is ethane.

References Cited in the file of this patent
UNITED STATES PATENTS

| | | |
|---|---|---|
| 1,920,795 | Jaeger | Aug. 1, 1933 |
| 2,518,295 | Denton et al. | Aug. 8, 1950 |
| 2,736,739 | England et al. | Feb. 28, 1956 |

OTHER REFERENCES

Platonov et al.: Chem. Abst., vol. 29, page 1769 (1935).

Gray et al.: Chem. Abst., vol. 33, page 4188 (1939).